(12) United States Patent
Martial Somda et al.

(10) Patent No.: US 10,723,098 B2
(45) Date of Patent: Jul. 28, 2020

(54) SANDWICH PANEL WITH RECESSED CHANNEL NETWORK

(71) Applicant: Airbus Operations GmbH, Hamburg (DE)

(72) Inventors: Nabankele Martial Somda, Hamburg (DE); Inge Sanders, Hamburg (DE); Bastian Schaefer, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 58 days.

(21) Appl. No.: 15/865,357

(22) Filed: Jan. 9, 2018

(65) Prior Publication Data

US 2018/0194096 A1    Jul. 12, 2018

(30) Foreign Application Priority Data

Jan. 10, 2017    (EP) .................................... 17150762

(51) Int. Cl.

| | | |
|---|---|---|
| *B32B 3/12* | (2006.01) | |
| *B32B 7/12* | (2006.01) | |
| *B32B 15/14* | (2006.01) | |
| *B32B 5/02* | (2006.01) | |
| *B32B 37/12* | (2006.01) | |
| *B32B 5/26* | (2006.01) | |

(Continued)

(52) U.S. Cl.
CPC .................. *B32B 3/12* (2013.01); *B32B 3/18* (2013.01); *B32B 3/266* (2013.01); *B32B 5/024* (2013.01); *B32B 5/26* (2013.01); *B32B 7/12* (2013.01); *B32B 15/14* (2013.01); *B32B 37/12* (2013.01); *B32B 38/0012* (2013.01); *B64C 1/06* (2013.01); *B32B 2250/03* (2013.01); *B32B 2260/023* (2013.01); *B32B 2262/0269* (2013.01); *B32B 2262/101* (2013.01); *B32B 2262/106* (2013.01); *B32B 2307/546* (2013.01); *B32B 2419/00* (2013.01); *B32B 2605/18* (2013.01); *B32B 2607/00* (2013.01); *B33Y 80/00* (2014.12)

(58) Field of Classification Search
CPC .. B32B 3/12; B32B 3/18; B32B 15/14; B32B 37/12; B64C 1/00
USPC .................................. 428/138, 189; 156/290
See application file for complete search history.

(56) References Cited

U.S. PATENT DOCUMENTS

| | | |
|---|---|---|
| 3,020,986 A | 2/1962 | Kirk et al. |
| 2006/0080835 A1 | 4/2006 | Kooistra et al. |

(Continued)

FOREIGN PATENT DOCUMENTS

| | | |
|---|---|---|
| WO | 2005014216 | 2/2005 |
| WO | 2010064916 | 6/2010 |
| WO | 2015125023 | 8/2015 |

OTHER PUBLICATIONS

European Search Report, dated Jul. 11, 2017, priority document.

*Primary Examiner* — Tri V Nguyen
(74) *Attorney, Agent, or Firm* — Greer, Burns & Crain, Ltd.

(57) ABSTRACT

A composite sandwich panel comprises a top layer, a bottom layer, and a honeycomb core layer sandwiched between the top layer and the bottom layer. The honeycomb core layer includes an array of hollow cells formed between vertical walls. This array of hollow cells is recessed in the form of a channel network running from a first side face of the sandwich panel through the honeycomb core layer to a second side face, opposite to the first side face of the sandwich panel.

8 Claims, 3 Drawing Sheets

(51) Int. Cl.
  *B32B 3/18* (2006.01)
  *B64C 1/06* (2006.01)
  *B32B 3/26* (2006.01)
  *B32B 38/00* (2006.01)
  *B33Y 80/00* (2015.01)

(56) References Cited

U.S. PATENT DOCUMENTS

| | | |
|---|---|---|
| 2009/0026804 A1 | 1/2009 | Ciprian |
| 2010/0327113 A1 | 12/2010 | Marquez et al. |
| 2011/0095574 A1 | 4/2011 | Brown |
| 2012/0040135 A1 | 2/2012 | Werthen et al. |
| 2016/0339666 A1 | 11/2016 | Steinbach et al. |
| 2018/0141302 A1* | 5/2018 | Baker ............... B29D 99/0021 |

* cited by examiner

SANDWICH PANEL WITH RECESSED CHANNEL NETWORK

CROSS-REFERENCES TO RELATED APPLICATIONS

This application claims the benefit of the European patent application No. 17150762.7 filed on Jan. 10, 2017, the entire disclosures of which are incorporated herein by way of reference.

BACKGROUND OF THE INVENTION

The present invention relates to a sandwich panel with a recessed channel network for embedding a space frame into the sandwich panel, a structural aircraft component employing a space frame structure embedded in such a sandwich panel, and a method for manufacturing a sandwich panel.

Beams, joists and frames for construction work, for example in aeronautics, civil engineering or architecture, are designed to withstand bending forces acting perpendicular to the direction of extension of the respective beams. Conventional beams may be implemented as an integral part with flanges at the edges and a web spanning between the flanges. Alternatively, instead of a web, cutter milled struts may be implemented between parallel running longitudinal support bars, thus leading to decreased weight of the beam due to less material being used to form the beam.

In order to save weight on board an aircraft, there have been several attempts to optimize the design of structural aircraft components. For example, document WO 2014/111707 A1 discloses a method for designing an object that includes analyzing a digital model corresponding to the object for portions that have been determined to, during use of the object, experience relatively high stresses. Those high stress regions are used to determine which portions of the object are to be produced using an Additive Manufacturing (AM) process, and which portions of the object are to be produced using a different suitable process, for example a machining process. Document US 2016/0297509 A1 discloses a sandwich panel for an aircraft having a lower top layer, an upper top layer and a core layer including pins that extend from a lower top layer in the direction of the upper top layer, the pins being interconnected by rods running inside the core layer, and forming a one-piece network. Document US 2011/0183104 A1 discloses a sandwich panel with a honeycomb-shaped core structure and plane-parallel cover layers applied to both sides of this core structure to form a floor surface in a fuselage airframe of an aircraft, the core structure having at least one recess into which at least one reinforcing structure is integrated.

There is, however, a need for structural components in aircraft that may be line- and retrofit more easily and that offer greater flexibility in design, appearance and branding for the airline.

SUMMARY OF THE INVENTION

One object of the invention is therefore to provide solutions that decrease the amount and weight of material needed to implement sandwich panels as used for structural aircraft components.

A first aspect of the disclosure pertains to a composite sandwich panel comprising a top layer, a bottom layer, and a honeycomb core layer sandwiched between the top layer and the bottom layer. The honeycomb core layer includes an array of hollow cells formed between vertical walls. This array of hollow cells is recessed in the form of a channel network running from a first side face of the sandwich panel through the honeycomb core layer to a second side face, opposite to the first side face of the sandwich panel.

According to a second aspect of the disclosure, a structural aircraft component comprises a substantially planar core panel having a space frame structure of load bearing space frame rods, with at least a portion of the core panel being embedded in a recessed channel network of a honeycomb core layer of a sandwich panel according to the first aspect of the disclosure.

According to a third aspect of the disclosure, a method for manufacturing a composite sandwich panel comprises gluing a honeycomb core layer including an array of hollow cells formed between vertical walls to a bottom layer; machining the array of hollow cells of the honeycomb core layer to form a recessed channel network running from a first side face to an opposite side face of the honeycomb core layer; gluing space frame rods of a space frame into the recessed channel network running through the honeycomb core layer; and attaching a top layer to the honeycomb core layer.

For space frame design, a two-staged evolutionary route-finding algorithm may be used for constructing a lightweight space frame structure optimized towards high mechanical stability and efficient load transfer and distribution. In a first stage, an adaptive dynamics scheme for heuristically determining a macroscopic space frame model following the most prominent load paths is employed. The adaptive dynamics scheme of the first stage is derived from the adaptive dynamics of a transport network of the amoeboid organism Physarum polycephalum. An optimization engine varies the input values of a pre-defined parametric model, produces a variety of space frame design options, and discards the lowest performing design options after a performance evaluation with a simplified and therefore rapidly working finite element (FE) model. The initial parameters of the surviving designs are used as starting point for the evolution of better performing designs, thereby approaching the pareto frontier as a stop criterion for the algorithm.

Then, in a second stage, the microstructure of each of the space frame members determined in the first stage may be evolved using a growth algorithm that iteratively adds member material in each of the space frame members in the direction of principal stress. The algorithm mimics the way bones and tissues grow in mammal bodies. Maximum strain failure may here be used as the stop criterion of the iterative optimization loop.

The generatively designed space frame structure is integrated into a surrounding carrier frame shaping the appearance of the structural component and adapting it to the surrounding structures in the aircraft. The generative design approach advantageously evaluates a large number of design options optimizing for both low weight and low structural deformation. Thus, this approach is able to reach weight reduction of up to 45% as compared to conventional honeycomb core sandwich structures while maintaining equal structural performance.

The designed model may then be taken as a basis for manufacturing the space frame members of the structural aircraft component in additive manufacturing processes. For greater flexibility, the space frame members may be divided in sub-components with appropriate joint mechanisms. Particularly advantageous may additionally be the reduction of costs, weight, lead time, part count and manufacturing complexity coming along with employing any kind of layer manufacturing technology when designing the components of the space frame, specifically the space frame rods and/or the concomitant connectors.

The composite sandwich panel of the invention provides for a flexible, lightweight and adaptable protection of such a designed a space frame structure. Specifically, when embedding portions of the space frame structure in a corresponding honeycomb core layer of a sandwich panel, derivated tension and compression loads that may occur in bending loadcases of the core panel are sustained by the top and bottom layers of the sandwich panel, while the shear loads are taken up by the space frame structure. Advantageously, the resistance to buckling of the sandwich panel is increased by virtue of the plain top and bottom layers and any high operational in-plane tension and shear loads that would otherwise act on the honeycomb core are absorbed by the space frame embedded in the honeycomb core.

According to an embodiment of the sandwich panel, the top layer may comprise one of glass-fiber fabric, carbon-fiber fabric and aramid-fiber fabric. According to a further embodiment of the sandwich panel, the bottom layer may comprise one of glass-fiber fabric, carbon-fiber fabric and aramid-fiber fabric.

According to a further embodiment of the sandwich panel, the honeycomb core layer may be glued to the bottom layer and/or the top layer.

According to a further embodiment of the sandwich panel, the sandwich panel may further comprise a honeycomb core infill panel having the inverse shape of the recessed channel network, the honeycomb core infill panel being sandwiched between the honeycomb core layer and the top layer.

According to a further embodiment of the sandwich panel, the honeycomb core layer may comprise one of fiberglass, carbon-fiber reinforced plastics, aramid-paper reinforced plastics and metallic materials.

According to a further embodiment of the sandwich panel, the recessed channel network may be machined into the honeycomb core layer.

According to an embodiment of the method for manufacturing a sandwich panel, the method may further comprise gluing a honeycomb core infill panel having the inverse shape of the recessed channel network to the honeycomb core layer, and machining the top surface of the honeycomb core infill panel before gluing the top layer to the top surface of the honeycomb core infill panel.

According to a further embodiment of the method for manufacturing a sandwich panel, the space frame rods of a space frame may be manufactured using an additive manufacturing process.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

Figure 1:
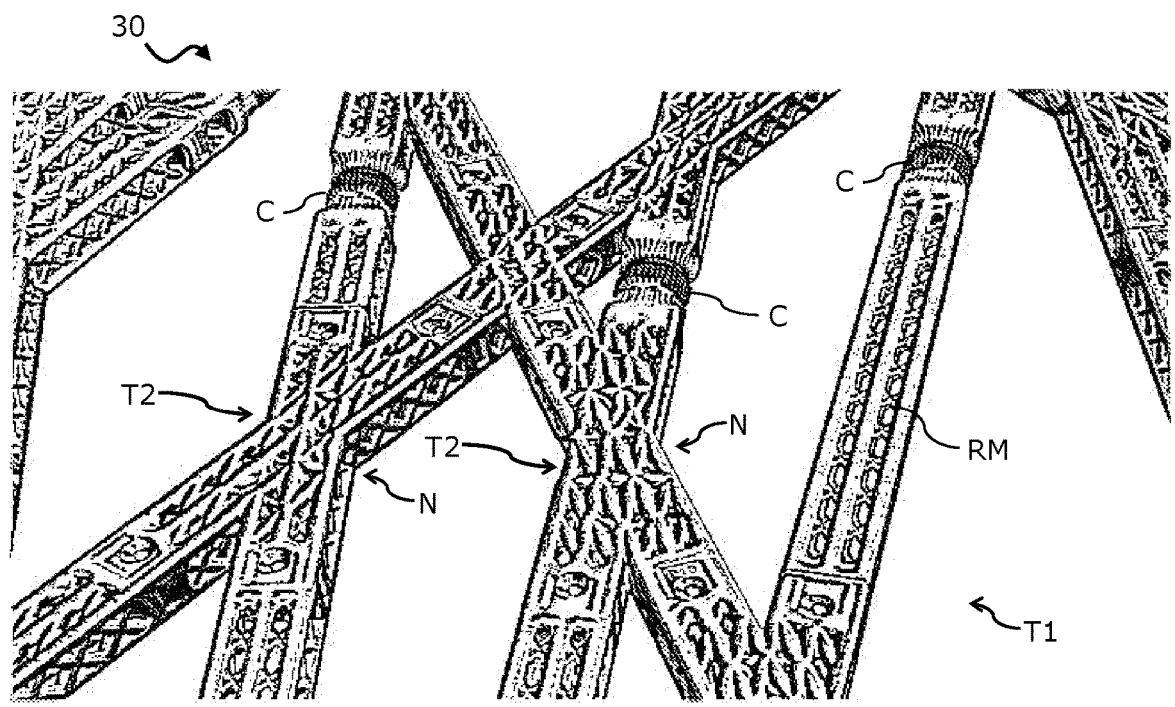
FIG. 1 schematically illustrates a perspective view of parts of a space frame according to an embodiment of the invention.

In the figures, like reference numerals denote like or functionally like components, unless indicated otherwise. Any directional terminology like "top," "bottom," "left," "right," "above," "below," "horizontal," "vertical," "back," "front," and similar terms are merely used for explanatory purposes and are not intended to delimit the embodiments to the specific arrangements as shown in the drawings.

DETAILED DESCRIPTION OF THE PREFERRED EMBODIMENTS

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Some of the components, elements and assemblies as disclosed hereinforth may be fabricated using free form fabrication (FFF), direct manufacturing (DM), fused deposition modelling (FDM), powder bed printing (PBP), laminated object manufacturing (LOM), stereolithography (SL), selective laser sintering (SLS), selective laser melting (SLM), selective heat sintering (SHS), electron beam melting (EBM), direct ink writing (DIW), digital light processing (DLP) and/or additive layer manufacturing (AM). Those techniques belong to a general hierarchy of additive manufacturing (AM) methods. Often termed as 3D printing, those systems are used for generating three-dimensional objects by creating a cross-sectional pattern of the object to be formed and forming the three-dimensional solid object by sequentially building up layers of material. Any of such procedures will be referred to in the following description as AM or 3D printing without loss of generality. AM or 3D printing techniques usually include selectively depositing material layer by layer, selectively fusing or solidifying the material and removing excess material, if needed.

3D or AM techniques may be used in procedures for building up three-dimensional solid objects based on digital model data. 3D/AM employs an additive process where layers of material are sequentially built up in different shapes. 3D/AM is currently used for prototyping and distributed manufacturing with multiple applications in engineering, construction, industrial design, automotive industries and aerospace industries.

Space frames within the meaning of the present disclosure may encompass any truss-like structure comprising a plurality of construction elements organized in a geometrical assemblage in space. The construction elements are shaped in such a way that forces being applied to the assemblage act substantially only on two points of the construction elements. The construction elements may themselves have any desired shape or form, being interconnected to other construction elements at joints or nodes of the assemblage.

FIG. 1 shows a perspective view of parts of a space frame T1 that may be used to construct a substantially planar core panel 30. The core panel 30 may, for example, be used in a structural aircraft component, such as a partition element of an aircraft. The space frame T1 may have a generally three-dimensional layout, i.e., for each first plane of extension defined by a subset of space frame rods RM, another subset of rods RM is connected to nodes N of the former subset in a manner that defines at least one further second plane of extension being arranged under a non-zero angle with respect to the first plane of extension. The number of space frame rods RM is generally not limited to any specific number, but instead their number will ultimately depend on the result of the optimization algorithm employed to find the optimal design of the space frame T1. Moreover, the number, kind, type and specific design of connectors C at the interconnection of adjoining space frame rods RM may vary depending on the particular optimized design and/or the desired maximum length of a single space frame rod RM.

The core panel 30 of FIG. 1 may generally be built up with a macroscopic space frame structure T1 of a plurality of partially intersecting space frame rods RM. The particular arrangement of the space frame rods RM may, for example, be determined by a computer-implemented design procedure that employs metaheuristic optimization algorithms for optimizing the load paths through the truss of space frame rods RM.

All structural members of the core panel 30 may, in particular, be manufactured using an Additive Manufacturing, AM, process. The structural members of the core panel 30 may, for example, be made from a suitable material accessible by the AM process, such as, for example, Scalmalloy™. Scalmalloy™ is an aluminum-magnesium-scandium alloy (AlMgSc) that has been developed for high and very high-strength extrusions, offering exceptionally high fatigue properties and the same positive manufacturing propensities as AlMgSc sheet material. In some embodiments, the core panel 30 may be manufactured in parts so that smaller AM machines and systems may be used. For example, it may be possible to break down the structural topology of the space frame structure T1 into a number of sub-components, such as, for example, 20 to 150 sub-components that may be separately 3D-printed on different ALM systems. Each sub-component may contain standardized connectors of different connector types which allow for proper connection between respective sub-components to be joined and for adjustment of tolerances between neighboring sub-components. In case of damage, the affected sub-components may be easily replaced at low cost.

The topology of the space frame rods RM themselves forms the macroscopic framework that may have a generally two-dimensional layout, i.e., the space frame rods R are substantially lying in one plane of extension (in the illustrated example of the figures, a vertically extending plane). Some or all of the space frame rods RM may be equipped with connectors C on their respective rod end portions.

Figure 5:
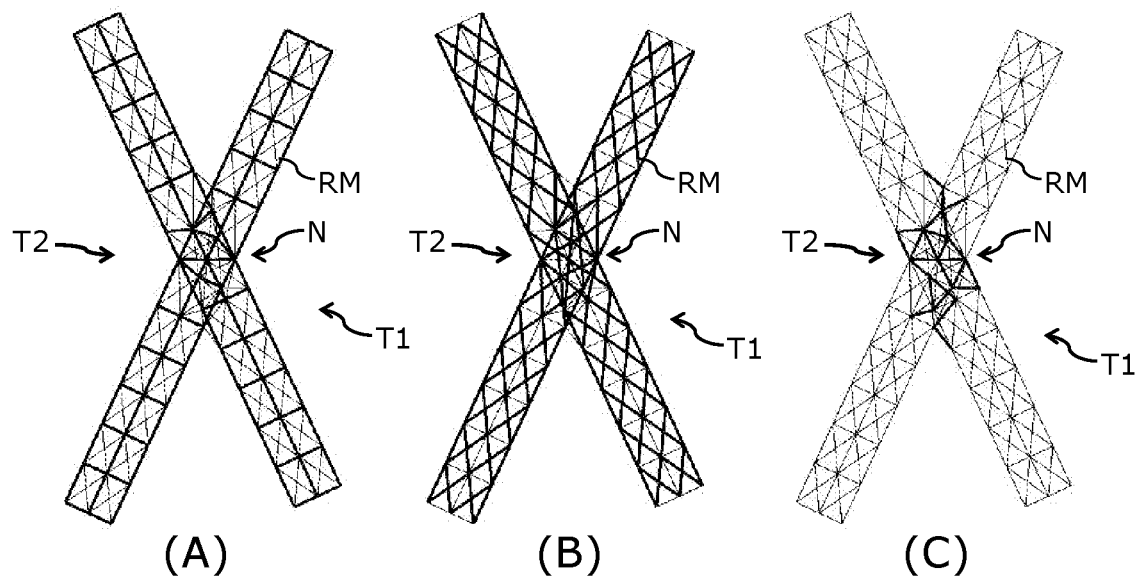
FIG. 5 schematically illustrates detail views of connection points of space frame rods in a space frame according to another embodiment of the invention.

Each of the space frame rods RM may be implemented with a microscopic framework T2 that is depicted in conjunction with FIG. 5, where three different interconnection node types (A), (B) and (C) between neighboring space frame rods RM are illustrated exemplarily. The microscopic framework T2 may be designed according to local load distributions that may be derived from load distribution models under pre-defined boundary conditions. In the node regions N between intersecting space frame rods, the laterally and diagonally running struts of the microscopic framework T2 of each of the space frame rods may be appropriately merged with each other. For each of the rods, the core part of the rod may be formed as a truss structure, i.e., a structure comprising two-force members which are assembled in a three-dimensional structure and connected as nodes. Typically, such truss structures may comprise polygonal constructed with straight members the ends and sometimes intermediate portions of which are connected at truss nodes. In the exemplary cases of FIG. 5, the microscopic frameworks T2 take on the shape of a frame having four substantially parallel beams extending along the direction of extension of the space frame rod RM and cross-hatched framework patches formed by diagonally staggered crossbeams between the four substantially parallel beams.

Figure 2:
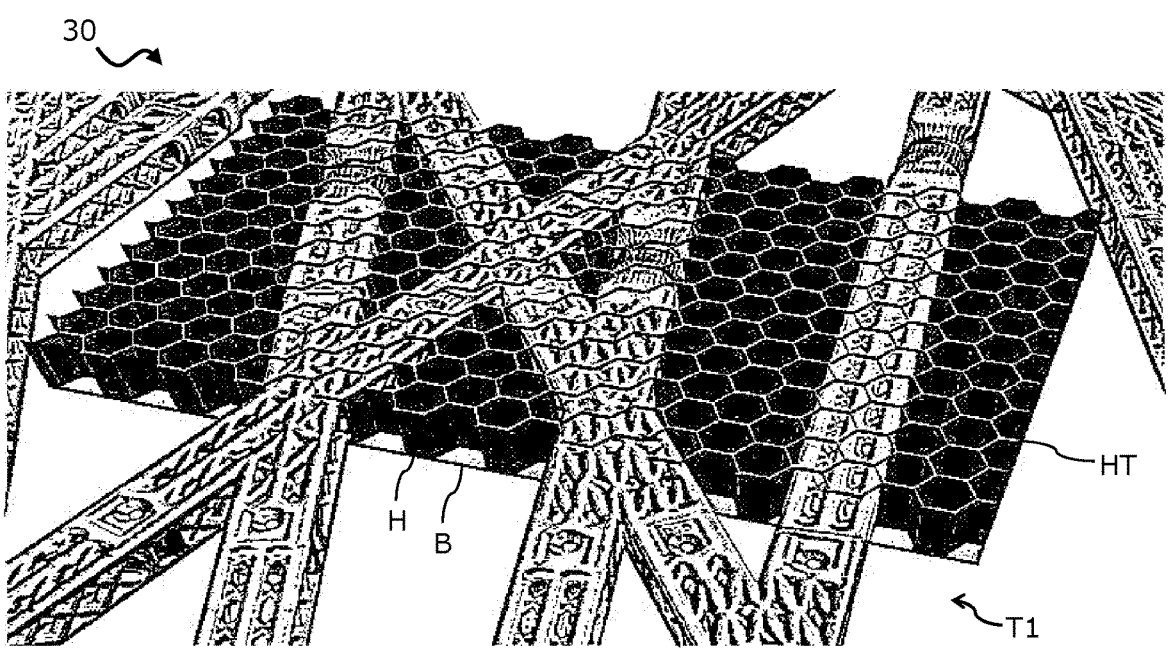
FIG. 2 schematically illustrates the space frame of FIG. 1 with a bottom layer and a honeycomb core layer of a sandwich panel partly assembled according to another embodiment of the invention.

In FIG. 2, the core panel 30 with the space frame of FIG. 1 is illustrated with a bottom layer B and a honeycomb core layer H of a sandwich panel S partly assembled thereto. The bottom layer B may itself comprise one layer only, or more than layer laminated together. The bottom layer B may, for example, be manufactured with glass-fiber fabric, carbon-fiber fabric or aramid-fiber fabric. The bottom layer B may generally be planar and may have a rectangular or quadratic circumferential shape. Of course, it may also be possible for the bottom layer B to be slightly curved. Further, the bottom layer B may have any other desired circumferential shape as well, such as the one of a trapezoid or a circular segment.

On top of the upper surface of the bottom layer B, a honeycomb core layer H is glued thereto. The honeycomb core layer H is machined to provide space for the framework, at least in the section where the shape of the bottom layer B intersects with the space frame. The honeycomb core layer H may generally have the same outer shape as the bottom layer B and may, in particular, be congruently placed on the bottom layer B such that the outer edges of the bottom layer B and the honeycomb core layer H are flush.

The honeycomb core layer H may, for example, be manufactured from fiberglass, carbon-fiber reinforced plastics, aramid-paper reinforced plastics or metallic materials. Particularly, the honeycomb core layer H may comprise an array of hollow cells spaced apart by thin vertical walls. The sectional shape of the hollow cells may have any form, such as hexagonal, cuboid or any other desired regular polygonal shape. In particular, the sectional shape of the hollow cells may be selected in order to allow a tessellation of the hollow cells to form an array without interspersed gaps between the individual hollow cells.

The honeycomb core layer H may be machined in such a way that the macroscopic framework structure T2 of the space frame at the location of the sandwich panel S is mapped onto a channel network of recessed channels R. In particular, the recessed channels R run from one side face (in FIG. 2 the front face) to another side face (in FIG. 2 the rear face) of the honeycomb core layer H. The channels R are exemplarily shown in more detail in FIG. 3. The width of the recessed channels R may generally correspond to the width of the individual space frame rods RM of the space frame that are to be embedded in the honeycomb core layer H. In the same way, the height of the recessed channels R may generally correspond to the height of the respective individual space frame rods RM of the space frame. The channels R may be recessed down to a fraction of the height of the honeycomb core layer H so that the honeycomb core layer H comprises a lower region that is continuously filled with hollow cells throughout the plane of extension of the honeycomb core layer H. This lower region stabilizes the honeycomb core layer H at the bottom and enables better adhesion to the bottom layer B.

After the individual space frame rods RM of the space frame have been inserted into the semi-assembled sandwich panel S, i.e., into the recesses of the honeycomb core layer H glued to the bottom layer B, a honeycomb core infill panel HT may optionally be placed on top of the honeycomb core layer H. The honeycomb core infill panel HT may have the inverse shape of the recessed channel network R, i.e., the outer shape of the honeycomb core infill panel HT matches the shape of the inserted individual space frame rods RM in the region of the sandwich panel S. The honeycomb core infill panel HT ensures surface uniformity before fully assembling the sandwich panel S by placing a top layer T onto the semi-assembled sandwich panel S. The fully assembled sandwich panel S is exemplarily shown in FIG. 4.

Depending on whether or not a honeycomb core infill panel HT is used or not, the honeycomb core layer H is either sandwiched between the honeycomb core infill panel HT and the bottom layer B or between the top layer T and the bottom layer B. The honeycomb core infill panel HT may be formed from the same materials as the honeycomb core layer H itself and may, for example, be machined after placing it on top of the embedded space frame rods RM in order to create a level surface for placing the top layer T on top of the honeycomb core infill panel HT.

Figure 3:
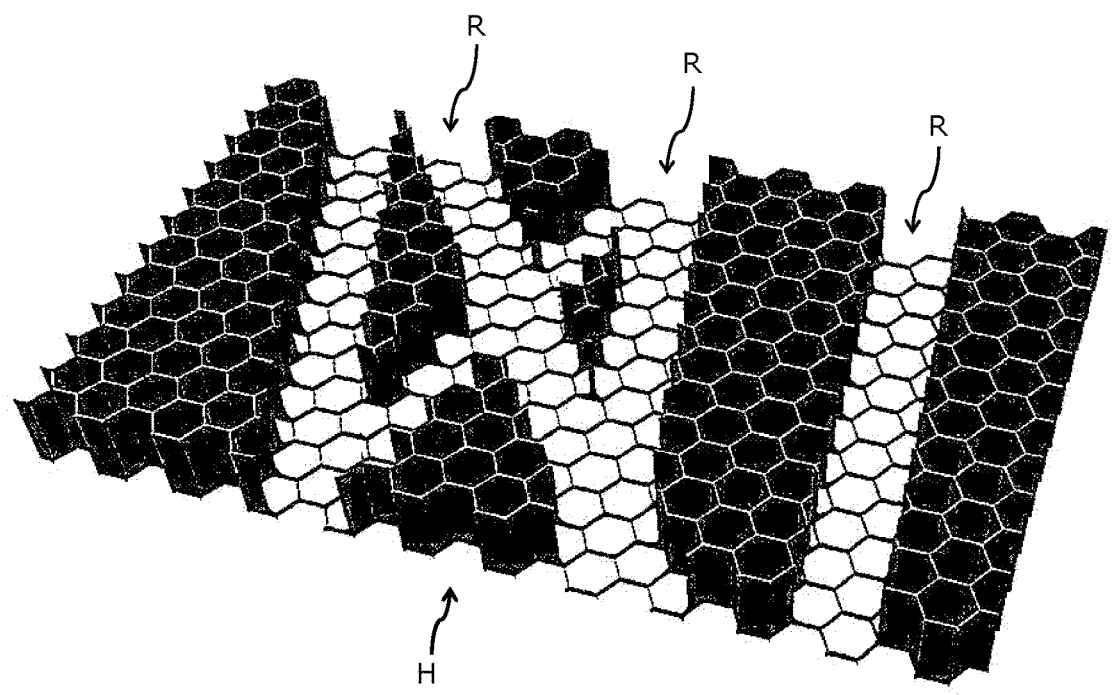
FIG. 3 schematically illustrates a partly machined honeycomb core layer of a sandwich panel for embedding the space frame of FIG. 2 according to another embodiment of the invention.
Figure 4:
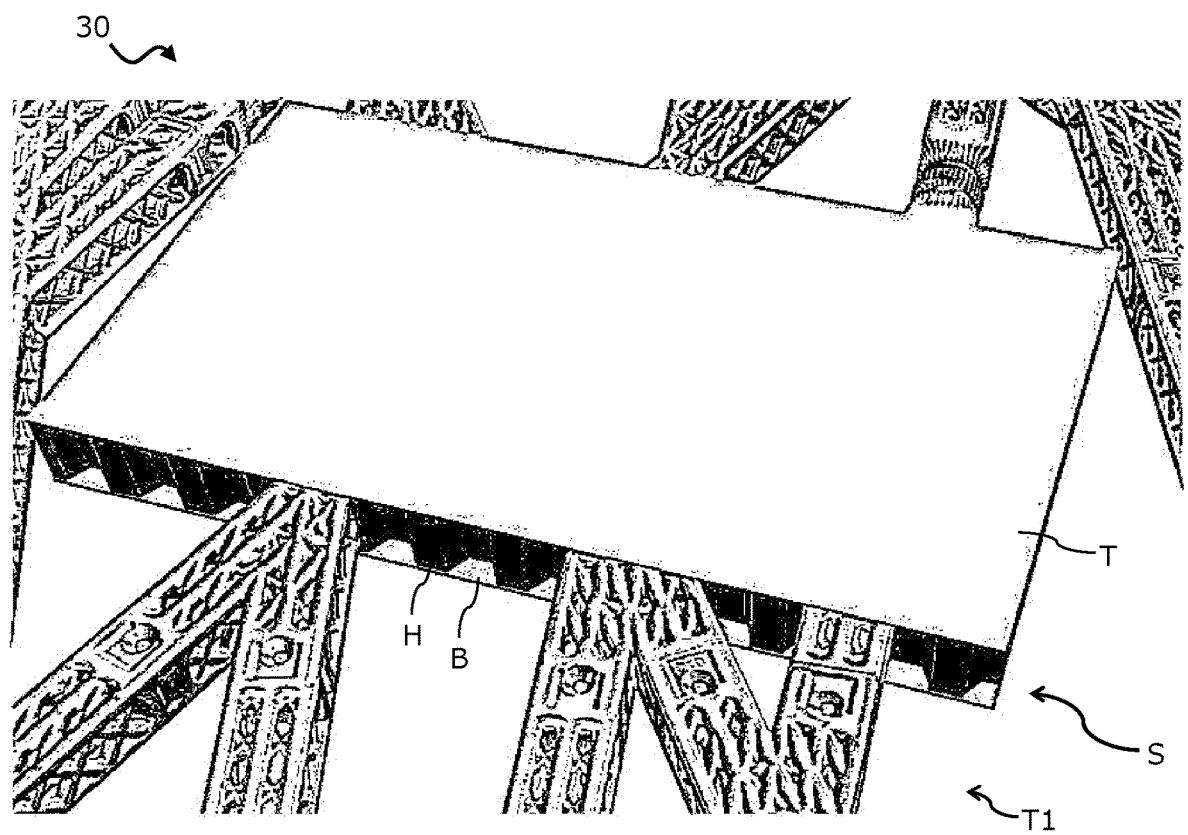
FIG. 4 schematically illustrates the space frame of FIG. 1 with a top layer, a bottom layer and a honeycomb core layer of a sandwich panel fully assembled according to another embodiment of the invention.
Figure 6:
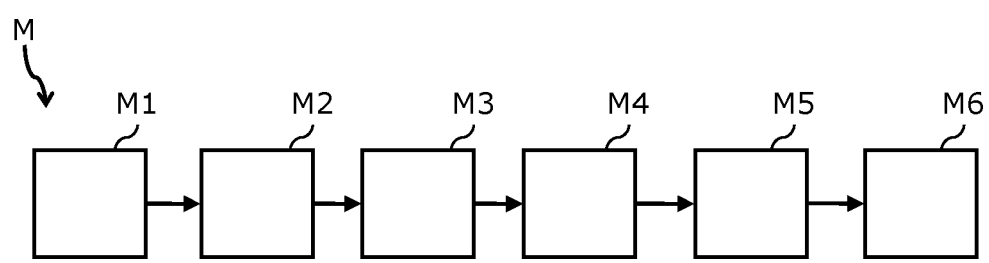
FIG. 6 schematically illustrates a block diagram for a method of manufacturing a sandwich panel according to another embodiment of the invention.

FIG. 6 schematically illustrates stages of a manufacturing method M for a sandwich panel, for example the sandwich panel S as illustrated in FIG. 4 and explained in conjunction with FIGS. 2, 3 and 5.

In a first stage M1, a honeycomb core layer H, including an array of hollow cells formed between vertical walls, is glued to a bottom layer B. Then, in a second stage M2, the array of hollow cells of the honeycomb core layer H is machined to form a recessed channel network R running from a first side face to an opposite side face of the honeycomb core layer H. The recessed channel network R thereby corresponds to the structure of a space frame with individual space frame rods RM in the region where the honeycomb core layer H is to embed the individual space frame rods RM.

The space frame rods RM of the space frame are then glued in a stage M3 into the recessed channel network R running through the honeycomb core layer H. Optionally, a honeycomb core infill panel HT having the inverse shape of the recessed channel network R may be glued in stage M4 to the honeycomb core layer H. In a stage M5, the top surface of the honeycomb core infill panel HT may be machined in order to provide for a level top surface of the honeycomb core infill panel HT.

Then, in a stage M6, a top layer T is glued to the honeycomb core layer H, or alternatively, to the top surface of the honeycomb core infill panel HT. Generally, the top layer T is attached to the top of the semi-assembled sandwich panel S to form a fully assembled sandwich panel S that embeds a portion of individual space frame rods R of the space frame along a certain length of their longitudinal extension.

The resulting composite sandwich panel S embedding the space frame as described above is a cheap, extremely light and flexible system that allows for rapid construction and deconstruction of multiple structures of varying outer profile. The composite sandwich panel S may, for example, be used to build up panels of a structural aircraft component, such as, for example, an aircraft cabin partition wall. The space frames embedded in the composite sandwich panels S as disclosed hereinforth may be used in many different applications, including—but not limited to—constructions of structural components in aircraft, interior design, bridge building, vehicle carriages, civil engineering, applications for children's toys and similar A particular application pertains to the construction of embedded core panels in structural aircraft components. Such core panels may include space frame rods for defining an overall outer shape of the structural aircraft components, for example within a component boundary predefined by a rigid outer carrier frame. Sandwich panels may reinforce the surfaces of the core panels, specifically under compression and buckling loads.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS AND SIGNS

30 Core panel
B Bottom layer
C Connector
H Honeycomb core layer
HT Honeycomb core infill panel
M Method M1 ... 6 Method stages
N Node
R Recessed channel
RM Space frame rod
S Sandwich panel
T Top layer
T1 Space frame structure
T2 Microscopic framework

The invention claimed is:

1. A composite sandwich panel, comprising:
a top layer;
a bottom layer; and
a honeycomb core layer sandwiched between the top layer and the bottom layer, the honeycomb core layer including an array of hollow cells formed between vertical walls, the array of hollow cells being recessed in the form of a channel network running from a first side face of the sandwich panel through the honeycomb core layer to a second side face of the sandwich panel, the second side face being located on the opposite side of the first side face of the sandwich panel,
wherein the recessed channel network of the honeycomb core layer of the sandwich panel has at least a portion of a planar core panel embedded therein, the planar core panel having a space frame structure of load bearing space frame rods,
wherein the space frame structure of load bearing space frame rods are interconnected within the honeycomb core layer.

2. The sandwich panel according to claim 1, wherein the top layer comprises one of glass-fiber fabric, carbon-fiber fabric and aramid-fiber fabric.

3. The sandwich panel according to claim 1, wherein the bottom layer comprises one of glass-fiber fabric, carbon-fiber fabric and aramid-fiber fabric.

4. The sandwich panel according to claim 1, wherein the honeycomb core layer is glued to the bottom layer.

5. The sandwich panel according to claim 1, wherein the honeycomb core layer is glued to the top layer.

6. The sandwich panel according to claim 1, further comprising:
a honeycomb core infill panel having the inverse shape of the recessed channel network, the honeycomb core infill panel being sandwiched between the honeycomb core layer and the top layer.

7. The sandwich panel according to claim 1, wherein the honeycomb core layer comprises one of fiberglass, carbon-fiber reinforced plastics, aramid-paper reinforced plastics and metallic materials.

8. The sandwich panel according to claim 1, wherein the recessed channel network is machined into the honeycomb core layer.

* * * * *